United States Patent
Schmötzer

(10) Patent No.: US 10,212,001 B2
(45) Date of Patent: Feb. 19, 2019

(54) METHOD OF CONFIGURING FIELD DEVICES AND FIELD DEVICE HAVING A CONFIGURATION FOR TWO BUS SYSTEMS

(71) Applicant: BUERKERT WERKE GMBH, Ingelfingen (DE)

(72) Inventor: Ralf Schmötzer, Hohebach (DE)

(73) Assignee: BUERKERT WERKE GMBH (DE)

(*) Notice: Subject to any disclaimer, the term of this patent is extended or adjusted under 35 U.S.C. 154(b) by 125 days.

(21) Appl. No.: 15/336,846

(22) Filed: Oct. 28, 2016

(65) Prior Publication Data
US 2017/0126424 A1 May 4, 2017

(30) Foreign Application Priority Data
Oct. 30, 2015 (EP) .................. 15192337

(51) Int. Cl.
*H04L 12/40* (2006.01)
*G06F 13/38* (2006.01)
*G06F 13/42* (2006.01)
*G05B 19/042* (2006.01)
*H04L 12/64* (2006.01)

(52) U.S. Cl.
CPC .......... *H04L 12/40* (2013.01); *G05B 19/0423* (2013.01); *G06F 13/385* (2013.01); *G06F 13/4282* (2013.01); *H04L 12/6418* (2013.01); *G05B 2219/25145* (2013.01); *G05B 2219/25428* (2013.01); *H04L 2012/40215* (2013.01); *H04L 2012/40228* (2013.01)

(58) Field of Classification Search
None
See application file for complete search history.

(56) References Cited

U.S. PATENT DOCUMENTS

| 6,711,629 | B1 | 3/2004 | Christensen |
| 8,621,432 | B2* | 12/2013 | Morris ................ G06F 8/34 |
| | | | 717/104 |
| 9,372,480 | B2 | 6/2016 | Gutermuth et al. |

(Continued)

FOREIGN PATENT DOCUMENTS

EP   1901145 A2   3/2008

OTHER PUBLICATIONS

European Search Report dated Apr. 20, 2016.

*Primary Examiner* — Henry Tsai
*Assistant Examiner* — Juanito Borromeo
(74) *Attorney, Agent, or Firm* — Carlson, Gaskey & Olds, P.C.

(57) ABSTRACT

Systems and methods of the subject invention provide for the communication with field devices in a first fieldbus system working in accordance with a first standard, and in a second fieldbus system working in accordance with a second standard. First and second field devices are arranged in the first fieldbus system and are coupled via a first fieldbus in accordance with the first standard. The first field device is also coupled to the second fieldbus system working in accordance with a second standard. A standardized object in accordance with the first standard is loaded on the first field device. A description of the standardized object is provided in the second fieldbus system. The standardized object is used from the second fieldbus system, the standardized object having no definition of a data type.

10 Claims, 1 Drawing Sheet

(56) References Cited

U.S. PATENT DOCUMENTS

2007/0280286 A1    12/2007  Hodson
2008/0094205 A1     4/2008  Thorn
2014/0121785 A1*    5/2014  Ismail ............... H04L 12/40032
                                                          700/3

* cited by examiner

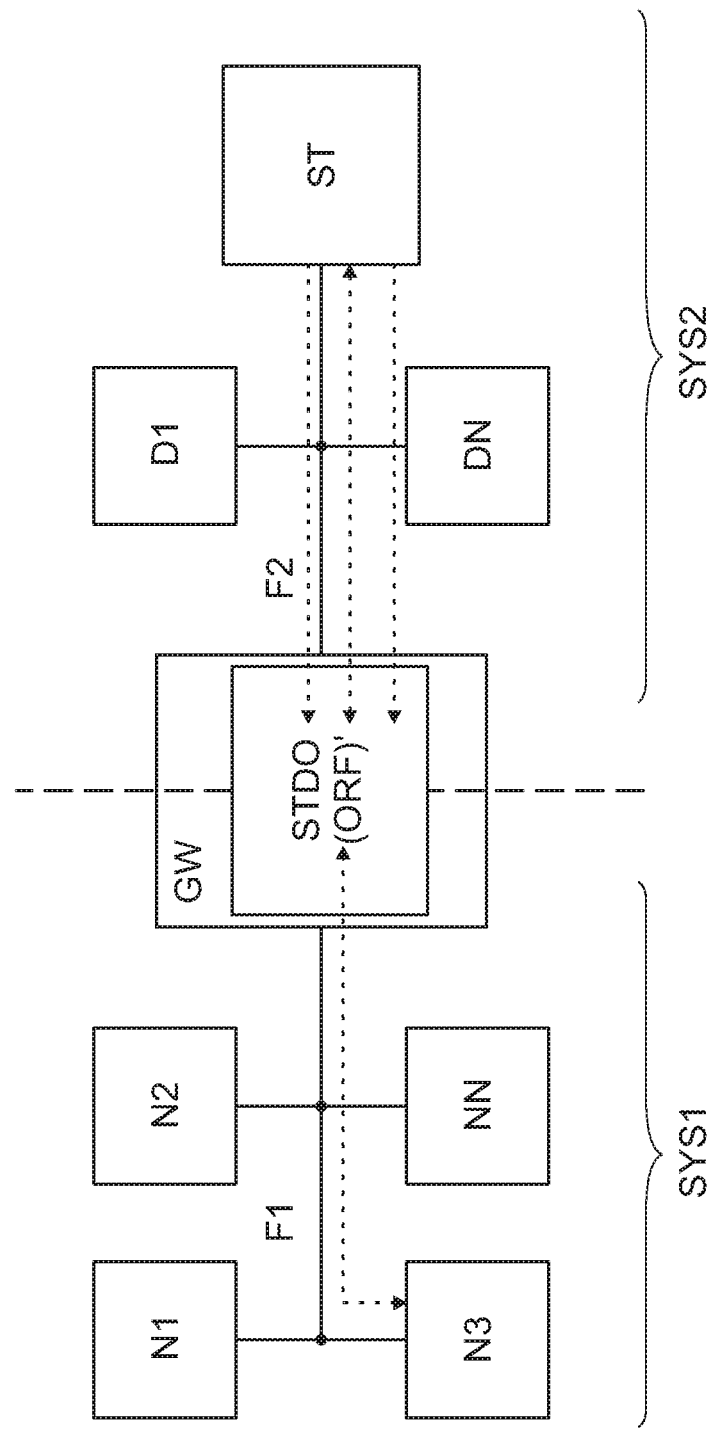

METHOD OF CONFIGURING FIELD DEVICES AND FIELD DEVICE HAVING A CONFIGURATION FOR TWO BUS SYSTEMS

CROSS-REFERENCE TO RELATED APPLICATIONS

This application claims priority to European Application No. 15 192 337.2, filed 30 Oct. 2015.

FIELD OF THE INVENTION

The present invention relates to fieldbus systems, field devices and methods for fieldbus systems and field devices.

BACKGROUND

Functions and properties of CANopen devices (field devices), for example, are largely described using objects and are managed in an object dictionary. The object dictionary is represented in an electronic form in so-called EDS files (Electronic Data Sheet). EDS files are an inherent part of standardization in the CANopen environment (CiA DS306 and CiA DS311) and have a fundamental importance when the configuration in CANopen networks is involved. The file format specified by CiA ensures that the device descriptions of tools (for example ProCANopen) of different software companies can be read and processed. An EDS file (electronic data sheet) is therefore an example for a device description file which is permanently stored as firmware on a field device and contains all information concerning the device-specific parameters and operating modes of the device. Using the device description file, the device is properly configured or put into operation.

It is basically possible to make a distinction between field devices having a permanent configuration and field devices having an adjustable configuration. In a field device having a permanent configuration, it is clearly defined which process data (for example digital inputs or current speeds) are transmitted at what time and by which fieldbus (for example CAN) message. These settings cannot be modified later. Devices having a permanent configuration are often less expensive to purchase than devices of identical design which permit a configuration of the device during operation. The reasons therefore are the considerably simpler software structures and the transparent device implementation resulting therefrom. Field devices having an adjustable configuration have to be configured before being put into operation. All device parameters are defined using an appropriate configuration tool (ProCANopen, for example). The configuration thus obtained is then stored in the device. In a field device having an adjustable configuration, the network configuration created using the configuration tool is also stored in the field device provided that the devices support the "nonvolatile" storage (configuration data are not lost at a restart) of the configuration data. Alternatively, the device configuration can be stored in a configuration manager which performs the configuration of the configurable devices at a system startup. The configuration manager has to be defined already within the context of the network configuration. This approach permits the simple replacement of a defective device with a new device of identical design (simple maintenance of the system).

A gateway is furthermore adapted to couple two fieldbus systems with each other. The two fieldbus systems may in principle be such of an identical standard or different standards. According to the prior art, parameters or variables from the one fieldbus system (CANopen, for example) are made accessible to the second fieldbus system via a defined memory area in the coupling gateway. This however requires on the side of the second fieldbus system a complex association of storage locations or storage areas with the parameters or variables of the first system. Furthermore, filed devices in subsystems are not accessible without exact knowledge of the subsystem or of the field devices, and any modification of the subsystem requires an adaptation of the firmware. This in particular makes the access to parameters of the subsystems which are retrieved only occasionally in particular situations, for example for a diagnostic, more difficult.

SUMMARY

It is the object of the invention to make the configuration of fieldbus devices easier for the user, in particular with regard to two coupled fieldbus systems (networks).

According to one aspect, a method is provided for the communication with field devices in a first fieldbus system (also first network, first fieldbus or subnetwork) and a second fieldbus system. The first fieldbus system works in accordance with a first standard and is set up according to this first standard. A first field device and a second field device are arranged in the fieldbus system of the first standard. The first field device and the second field device are then coupled via a fieldbus according to the first standard. The first field device is also coupled to a second fieldbus system (also second network, second fieldbus or main network) which is set up in accordance with a second standard and works according to this second standard. A standardized object (also "Object Route Function" or "ORF") according to the first standard is loaded on the first field device. The standardized object advantageously contains no definition of a data type. Furthermore, a description/definition (device description) of the standardized object is provided in the second standard. From the second fieldbus system (main network), it is then accessed to parameters/objects of the second field device in the first fieldbus system via the first field device using the standardized object.

This permits a transparent access to a first fieldbus system (subnetwork) abstracted by the first field device without requiring a mapping. The standardized object permits direct access to each individual subscriber in the first fieldbus system (subnetwork) downstream of the first field device. The standardized object of the first field device serves here as an interface to the respective other communication protocol. Any object within the first fieldbus system can be addressed via this standardized object (interface).

The standardized object may advantageously have at least fields having the following definitions: a target specification (an index and/or a subindex and/or a node identification number), if required a data length for a write access and a value.

The standardized object in particular permits an acyclic retrieval of parameters or values from the first fieldbus system via the first field device via the standardized object.

The first field device can advantageously be a gateway.

The first standard may be a CANopen standard as described at the beginning and described, for example, in the CiA 306 Draft Standard Proposal, version: 1.3.7 of Mar. 18, 2014. Further norms which are used for the first standard are:

/CiA301/ CiA 301, CANopen application layer and communication profile

/CiA302/ CiA 302-4, CANopen Additional application layer functions Part 4: Network variables and process image
/CiA305/ CiA 305, CANopen layer setting services (LSS) and protocols
/CiA401/ CiA 401, CANopen device profile generic I/O modules
/ISO646/ ISO/IEC 646, ISO 7-bit coded character set for information interchange For the field devices in the first fieldbus system according to the first standard, device description files according to the first standard are advantageously used in the form of EDS (Electronic Data Sheet) device description files for the CANopen standard as described above. The field devices for the first standard are then configured for a fieldbus system according to the CANopen standard. Cyclic retrievals may then also be performed using conventional objects, for example.

The second standard may be a standard for Fieldbus (for example Profibus, Modbus, DeviceNet, CANopen) or for Industrial Ethernet (for example Profinet, ModbusTCP, EthernetIP, Ethercat, Powerlink).

The standards/specifications are defined and maintained by the respective Technology Groups or Foundations, and are thus continuously modified, completed and can be found on the internet at the following links:
Profinet PNO:
  http://www.profibus.com/technology/profinet/
EthernetIP ODVA:
  http://www.odva.org/Technology-Standards/EtherNet-IP/Overview
ModbusTCP Modbus Organization:
  http://www.modbus.org/undimSpeziellen: ModbusTCP
  http://www.modbus.org/docs/Modbus_Application_Protocol_V1_1b.pdf For Profinet, in particular the GSDML device description, the following version of the standards may for example be applied:
GSDML Technical Specification for PROFINET IO Version 2.3, date November 2011

For Ethernet/IP, for example merely the following version comes into consideration:
The CIP Networks Library Volume 2: EtherNet/IP Adaptation of CIP, Edition 1.19, April 2015

According to the first standard, a normal object (i.e. not the standardized object) can for example be defined by particular preset specifications. The following specifications can be used: a parameter name (ParameterName; necessary); an object type (ObjectType (VAR); optional); a data type (DataType; necessary); an access Type (AccessType; necessary); a default value (DefaultValue; optional); the PDOMapping (optional); the SubNumber (optional); a lower limit (LowLimit; optional); an upper limit (HighLimit; optional); a flag (OjbFlags; optional), and the value CompactSubOjb (optional). From this follows that the minimum specification for a normal object according to the first standard is composed of the specification of a parameter name, a data type and an access type. One example for the source code of an object according to the first standard using a subindex is for example:
[1003]
SubNumber=2
ParameterName=Pre-defined error field
ObjectType=8
[1003sub0]
ParameterName=Number of errors
ObjectType=0x7
DataType=0x0005
AccessType=ro
DefaultValue=0x1
PDOMapping=0
[1003sub1]
ParameterName=Standard error field
ObjectType=0x7
DataType=0x0007
AccessType=ro
DefaultValue=0x0
PDOMapping=0

In contrast thereto, a standardized object uses a modified form which dispenses with the specification of a data type. The standardized object uses a minimum set of specifications as described above and below. This permits an access to all parameters of the first fieldbus system (subnetwork) from the second fieldbus system (main network) without a configuration of the first field device (gateway) being necessary. Furthermore, no resources (storage space) are bound by the temporary storage of all values. An acyclic retrieval of the parameters is in addition possible.

The present invention also provides a system. The system comprises a first field device and a second field device which are coupled via a first fieldbus (or a first fieldbus system) working in accordance with a first standard, the first field device having a standardized object according to the first standard such that a communication from the second fieldbus system with the second field device via the first field device is possible. The standardized object has no definition of a data type.

The standardized object may at least include fields having the following definitions: a target specification (for example an index and/or a subindex and/or a node identification number), if required a data length for a write access and a value. Further aspects and properties of the system result from the above and the following description.

As explained above, a first communication protocol according to the first standard is used in the first fieldbus system. Field devices or also nodes which are coupled to each other and to the first field device or also gateway via the first fieldbus are arranged in the first fieldbus system. The first field device is also coupled to a second fieldbus system or also main network which works in accordance with a second standard. A second communication protocol is in particular used in the second fieldbus system which works in accordance with the second standard. The second communication protocol is different from the first communication protocol. In this respect, it is possible to make a distinction between the first fieldbus system or the network and the second fieldbus system or network in that at least two different communication protocols are used in the two networks.

BRIEF DESCRIPTION OF THE DRAWINGS

Further aspects and features of the invention will become apparent from the following description of example embodiments with reference to the accompanying FIGURE, wherein FIG. 1 is a simplified block representation of an example embodiment.

DETAILED DESCRIPTION

FIG. 1 is a simplified bloc representation of an example embodiment. It shows a first fieldbus system or a subnetwork SYS1 working in accordance with a first standard. The first standard can be CANopen. Accordingly, a first communication protocol according to the first standard is used in the first fieldbus system SYS1. Field devices or also nodes N1, N2, N3 to NN which are coupled to each other and to the first field device or gateway GW via the first fieldbus F1 are arranged in the first fieldbus system. The first field device GW is also coupled to a second fieldbus system or also main network SYS2 which works in accordance with a second standard. A second communication protocol working according to the second standard is in particular used in the second fieldbus system SYS2. The second communication protocol is different from the first communication protocol. In this respect, it is also possible to make a distinction between the first fieldbus system or network SYS1 and the second fieldbus system or network SYS2 in that at least two different communication protocols are used in the two networks SYS1, SYS2. Field devices or simply devices D1 to DN and a control ST which are coupled to each other via a second fieldbus or a network F2 are provided in the second fieldbus system SYS2. The second fieldbus F2 is also coupled to the first field device GW. A standardized object STDO which is set up in accordance with the first standard according to the specifications in the columns sub "Object Route Function" of the following table is now provided in the first field device GW. The table additionally contains the description of the standardized object for the second standard which can be Profinet, Ethernet/IP (Industrial Ethernet) or Modbus, for example.

second standard. It is then possible to access the fields of the standardized object from a second fieldbus system SYS2 which works in accordance with the Profinet standard, for example, via the specifications Slot "0", Subslot "1" and Index "1" to "6". By analogy, in case the second fieldbus system SYS2 works in accordance with Ethernet/IP, the access is realized via the corresponding Class, Instance and Attribute commands and in the case of the Modbus via the given addresses.

In FIG. 1, a solid line represents a permanent or wireless connection via the corresponding fieldbus F1, F2. The dotted lines represent the direct accesses using the standardized object STDO. The dashed line illustrates the division into the two networks or fieldbus systems SYS1, SYS2.

All in all, this permits a direct access to parameters/objects of field devices N1 to NN in the first fieldbus system SYS1 from the second fieldbus system SYS2. These direct accesses can advantageously be realized in an acyclic manner and can, for example, be executed by the control ST.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:
1. A method for communication with field devices in a first fieldbus system working in accordance with a first

TABLE

| Object Route Function | | | Profinet | | | Ethernet/IP | | | Modbus |
|---|---|---|---|---|---|---|---|---|---|
| Index | Subindex | Function | Slot | Subslot | Index | Class | Instance | Attribute | Address |
| 0x3C31 | 0x01 | Index/Subindex/NodeID | 0 | 1 | 1 | C7 | 1 | 3 | 1000 |
| | 0x02 | Data length for write access | 0 | 3 | 2 | C7 | 2 | 3 | 1002 |
| | 0x03 | Value UINT32 | 0 | 3 | 3 | C7 | 3 | 3 | 1004 |
| | 0x04 | Value string | 0 | 3 | 4 | C7 | 4 | 3 | 1006 |
| | 0x05 | result | 0 | 1 | 5 | C7 | 5 | 3 | 1016 |
| | 0x06 | call/cancel | 0 | 1 | 6 | C7 | 6 | 3 | 1018 |

In detail, the specifications have the following meaning:

Index/Subindex/NodeID: Index and subindex of the object from which it is desired to read/write. It is additionally necessary to indicate the NodeID of the device (field device in the first fieldbus system SYS1). The index and subindex are stored in the device specification, for example EDS.

Data length for write access: It defines the data length of the write command in bytes. The data length need not be indicated for reading.

Value UINT32: The value to be written is preset or the value read out is reproduced here.

Value string: Serves to read and write texts, data greater than 4 bytes.

result: Result of operation 0=command successfully executed, 0<error occurred during execution, FFFFFFFF=read/write operation not yet completed call/cancel: executes the command.

Therefore, the specifications of the standardized object comprise at least one target specification (Index/Subindex/NodeID), a data length (but only for a write command) (Data length for write access) and a value (Value UINT32; Value string). Furthermore, there is a field for the result (result) and a field for calling or cancelling (call/cancel). These fields of the standardized object are translated into the corresponding standard, and in a second fieldbus system working in accordance with a second standard, comprising the steps of:
arranging a first field device and a second field device in the first fieldbus system;
coupling the first field device and the second field device via a first fieldbus in accordance with the first standard;
coupling the first field device to the second fieldbus system working in accordance with the second standard;
loading a standardized object in accordance with the first standard on the first field device;
providing a description of the standardized object in the second fieldbus system; and
using the standardized object from the second fieldbus system to retrieve acyclically parameters or values of the second field device in the first fieldbus system from the second fieldbus system and via the first field device using the standardized object, the standardized object having no definition of a data type.

2. A method for communication with field devices in a first fieldbus system working in accordance with a first standard, and in a second fieldbus system working in accordance with a second standard, comprising the steps of:
arranging a first field device and a second field device in the first fieldbus system;

coupling the first field device and the second field device via a first fieldbus in accordance with the first standard;

coupling the first field device to the second fieldbus system working in accordance with the second standard;

loading a standardized object in accordance with the first standard on the first field device;

providing a description of the standardized object in the second fieldbus system; and using the standardized object from the second fieldbus system, the standardized object having no definition of a data type and fields having the following definitions: a target specification, in particular a data length for a write access and a value.

3. The method according to claim 1, wherein the first field device is a gateway.

4. The method according to claim 1, wherein the first standard is CANopen.

5. The method according to claim 1, wherein the second standard is a standard for Fieldbus, in particular Profibus, Modbus, DeviceNet or CANopen or for Industrial Ethernet, in particular Profinet, ModbusTCP, EthernetIP, Ethercat or Powerlink.

6. A system comprising:

a first field device and a second field device which are coupled via a first fieldbus system working in accordance with a first standard, the first field device being also coupled to a second fieldbus system set up in accordance with a second standard and working in accordance therewith; and wherein the first field device has a standardized object in accordance with the first standard to communicate with the second field device from the second fieldbus system directly via the first field device to retrieve acyclically parameters or values of the second field device in the first fieldbus system from the second fieldbus system and via the first field device using the standardized object, the standardized object having no definition of a data type.

7. A system comprising:

a first field device and a second field device which are coupled via a first fieldbus system working in accordance with a first standard, the first field device being also coupled to a second fieldbus system set up in accordance with a second standard and working in accordance therewith; and wherein the first field device has a standardized object in accordance with the first standard to communicate with the second field device from the second fieldbus system directly via the first field device, the standardized object having no definition of a data type and fields having the following definitions: a target specification, in particular a data length for a write access and a value.

8. The system according to claim 6, wherein the first field device is a gateway.

9. The system according to claim 6, wherein the first standard is CANopen.

10. The system according to claim 6, wherein the second standard is a standard for Fieldbus, in particular Profibus, Modbus, DeviceNet, or CANopen or for Industrial Ethernet, in particular Profinet, ModbusTCP, EthernetIP, Ethercat or Powerlink.

* * * * *